(12) United States Patent
Kawai

(10) Patent No.: US 8,717,661 B2
(45) Date of Patent: May 6, 2014

(54) ELECTROPHORESIS DEVICE AND ELECTRONIC APPARATUS

(75) Inventor: Hideyuki Kawai, Fujimi (JP)

(73) Assignee: Seiko Epson Corporation (JP)

( * ) Notice: Subject to any disclaimer, the term of this patent is extended or adjusted under 35 U.S.C. 154(b) by 1707 days.

(21) Appl. No.: 11/463,088

(22) Filed: Aug. 8, 2006

(65) Prior Publication Data

US 2007/0040798 A1  Feb. 22, 2007

(30) Foreign Application Priority Data

Aug. 22, 2005 (JP) ................. 2005-239791

(51) Int. Cl.
*G02F 1/167* (2006.01)
*G02F 1/01* (2006.01)

(52) U.S. Cl.
USPC .......................... 359/296; 345/107

(58) Field of Classification Search
USPC .......... 359/296; 428/332, 702, 523, 690, 917; 313/506, 509, 512; 257/100; 345/107, 345/296
See application file for complete search history.

(56) References Cited

U.S. PATENT DOCUMENTS

| | | | | |
|---|---|---|---|---|
| 5,120,618 | A * | 6/1992 | Mori et al. ................. | 428/690 |
| 2004/0085618 | A1 * | 5/2004 | Kawai ........................ | 359/296 |
| 2005/0181533 | A1 * | 8/2005 | Kawase et al. ............. | 438/82 |
| 2006/0062995 | A1 * | 3/2006 | Yamamoto .................. | 428/332 |

FOREIGN PATENT DOCUMENTS

| | | |
|---|---|---|
| JP | 2005-114820 | 4/2005 |
| JP | 2005-114822 | 4/2005 |

* cited by examiner

*Primary Examiner* — J. Christopher Ball
*Assistant Examiner* — Gurpreet Kaur
(74) *Attorney, Agent, or Firm* — Harness, Dickey & Pierce, P.L.C.

(57) ABSTRACT

An electrophoresis device includes a translucent first substrate having a first electrode on one surface thereof; a second substrate having a second electrode on one surface thereof, and disposed to face the first substrate such that a protruding portion which does not overlap the first substrate in a substrate thickness direction is ensured at one side of the second substrate; a wiring pattern electrically connected to the second electrode via a connector passing through the second substrate, and provided on the other surface of the second substrate such that it extends to the protruding portion of the second substrate; an electrophoretic layer interposed between the first electrode and the second electrode; a translucent first moistureproof film having a portion contacting the other surface of the first substrate and a surplus portion disposed around the portion; and a second moistureproof film having a portion contacting the other surface of the second substrate and a surplus portion disposed around the portion and provided such that at least a portion of the protruding portion of the second substrate is exposed. Electrical connection between the wiring pattern and an external device is established at a place where the protruding portion of the second substrate is exposed.

8 Claims, 5 Drawing Sheets

1

1a

ELECTROPHORESIS DEVICE AND ELECTRONIC APPARATUS

BACKGROUND

1. Technical Field

The present invention relates to an electrophoresis device that uses electrophoresis, (a phenomenon of) movement of charged particles in medium caused by application of a voltage, for image formation purpose, etc. The invention further relates to an electronic apparatus including the electrophoresis device.

2. Related Art

One of the excellent features of display devices using electrophoresis, particularly, microcapsule-type electrophoresis display devices is their flexibility. A flexible display device is provided easily with use of films of resin, etc., (where the films are used) as two substrates that sandwich an electrophoretic dispersion liquid. It is expected that such a device will be used as an electronic paper and other electronic apparatuses. However, use of films in place of glass causes degradation in quality of an electrophoresis display device due to moisture penetration. A film substrate does not sufficiently prevent moisture penetration whereas a glass substrate does. Therefore, degradation will occur due to moisture penetration if an electrophoresis display device having films is exposed to a high-temperature and high-humidity atmosphere for a long time, which deteriorates display quality significantly. As solutions to such a problem, JP-A-2005-114820 and JP-A-2005-114822 disclose electrophoresis display devices with a structure in which moisture penetration is blocked by laminating a transparent resin protective film on a substrate (first substrate) on the side of a display surface, and providing a vapor-blocking resin layer in a gap between the transparent resin protective film and a substrate (second substrate) on the side of a non-display surface in a peripheral end face of the display surface.

Meanwhile, in the electrophoresis devices having the above structure, in order to supply driving signals to the electrophoretic dispersion liquid, it is necessary to provide a wiring pattern from the inside of the first substrate or the second substrate toward the end thereof, and to electrically connect the wiring pattern at this end to external devices (a voltage-applying circuit, a control circuit, etc.). Specifically, a structure in which the first substrate or the second substrate is caused to protrude further to the outside than the vapor-blocking resin layer in the peripheral end face of the electrophoresis device, and the wiring pattern at the end of the substrate is exposed to the outside can be considered. However, if such structure is adopted, since the width of the peripheral end face of the electrophoresis device, i.e., the width of a frame portion which does not contribute to display, equals a sum of the width of sealing formed by the vapor-blocking resin layer and the width of the first substrate or the second substrate for allowing the wiring pattern to protrude, the width of the frame portion is increased. For this reason, it is difficult to meet a demand for narrowing the frame portion of the electrophoresis device, and thus there is further room for improvement of this point.

SUMMARY

An advantage of the invention is that it provides an electrophoresis device with a narrowed frame portion.

According to an aspect of the invention, an electrophoresis device includes: a translucent first substrate having a first electrode on one surface thereof; a second substrate having a second electrode on one surface thereof, and disposed to face the first substrate such that a protruding portion which does not overlap the first substrate in a substrate thickness direction is ensured at one end of the second substrate; a wiring pattern electrically connected to the second electrode via a connector passing through the second substrate, and provided on the other surface of the second substrate such that it extends to the protruding portion of the second substrate; an electrophoretic layer interposed between the first electrode and the second electrode; a translucent first moistureproof film having a portion contacting the other surface of the first substrate and a surplus portion disposed around the portion; and a second moistureproof film having a portion contacting the other surface of the second substrate and a surplus portion disposed around the portion and provided such that at least a portion of the protruding portion of the second substrate is exposed. Electrical connection between the wiring pattern and an external device is established at a place where the protruding portion of the second substrate is exposed.

According to such a configuration, since the width (for example, width required for provision of sealant) required for moistureproof sealing, and the width for electrical connection with an external device overlap each other in the substrate thickness direction, it is possible to make the frame portion small accordingly, and to narrow a frame portion of the electrophoresis device.

Preferably, the electrophoresis device further includes a first sealant provided between the first moistureproof film and the protruding portion of the second substrate, and between the surplus portion of the first moistureproof film and the surplus portion of the second moistureproof film.

Since the width for provision of the first sealant and the width for electrical connection with an external device overlap each other, a broader width of the first sealant can be can be provided without deteriorating advantages resulting from narrowing of the frame portion. This allows compatibility between narrowing of the frame portion and high moistureproofing.

Preferably, the electrophoresis device further includes a second sealant provided so as to cover at least a place where the wiring pattern and the external device are connected together, and the vicinity thereof, and an end face of the protruding portion of the second substrate.

This makes it possible to further improve a moistureproof effect.

Preferably, the surplus portion of the first moistureproof film, the surplus portion of the second moistureproof film, and the protruding portion of the second substrate are bonded together.

This configuration makes it unnecessary to provide the above-mentioned first sealant and makes it possible to simplify the sealing structure. Since a larger width of sealing can be ensured even in this case, compatibility between narrowing of the frame portion and high moistureproofing is allowed.

In the above case, preferably, the electrophoresis device further includes a sealant provided so as to cover at least a place where the wiring pattern and the external device are connected together, and the vicinity thereof, and an end face of the protruding portion of the second substrate.

This makes it possible to further improve a moistureproof effect.

According to another aspect of the invention, an electronic apparatus includes the above-described electrophoresis device as a display unit. Here, the "electronic apparatus" includes all apparatuses provided with a display unit using the display by an electrophoretic material, and more specifically, includes display apparatuses, TV apparatuses, electronic papers, clocks, electronic calculators, portable telephones, personal digital assistants (PDAs), etc. Further, the concept of the "apparatus" may include arbitrary things, for example, flexible sheet-like or film-like objects, things belonging to real estate, such as wall surfaces to which these objects are pasted, and things belonging to movable bodies, such vehicles, flying bodies, and vessels.

According to this configuration, it is possible to obtain an electronic apparatus including a high-quality display unit in which narrowing of the frame portion is compatible with moistureproofing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

Figure 1:
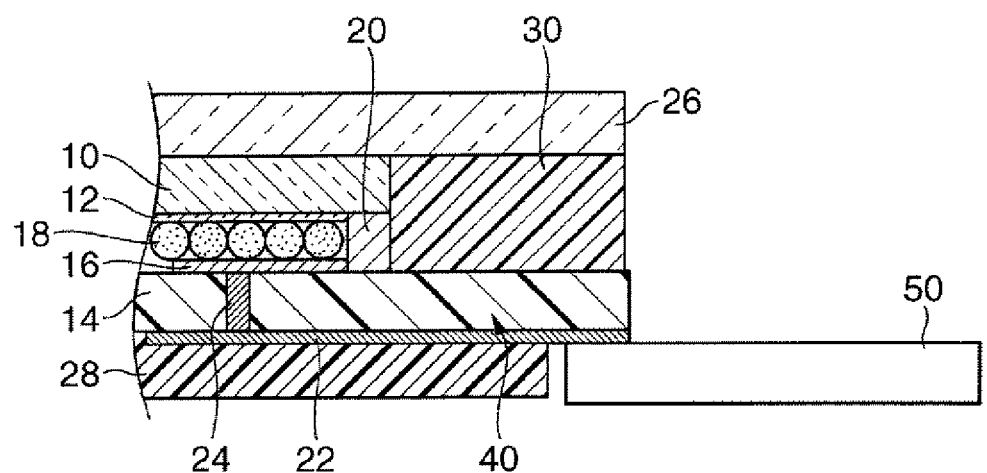
FIG. 1 is a sectional view showing the structure of an electrophoresis device according to a first embodiment.

FIG. 1 is a sectional view showing the structure of an electrophoresis device according to a first embodiment. The electrophoresis device 1 shown in FIG. 1 mainly includes a first substrate 10, a first electrode 12, a second substrate 14, a second electrode 16, an electrophoretic layer 18, a wiring pattern 22, a first moistureproof film 26, a second moistureproof film 28, and sealant 30. An external device 50 composed of a voltage-applying circuit, a control circuit, etc. is electrically connected to an end of the electrophoresis device.

The first substrate 10 has formed on one surface thereof the first electrode 12 made of a transparent conductive film, such as ITO (tin-doped indium oxide), and is formed so as to cover the top of the electrophoretic layer 18. In this embodiment, a substrate having translucency and flexibility, such as a transparent insulating synthetic resin substrate, is used as the first substrate 10. In addition, hard substrates, such as a glass substrate and a relatively thick plastic substrate, may be used. The thickness of the first substrate 10 is preferably 10 to 200 μm, and more preferably 25 to 75 μm.

The second substrate 14 has on one surface thereof the second electrode 16 made of a conductive film, such as aluminum, and is disposed to face the first substrate 10 such that the existence of a protruding portion 40 which does not overlap the first substrate 10 in the substrate thickness direction is ensured at one end of the second substrate. Specifically, in the electrophoresis device 1 according to this embodiment, as shown in the figure, the second substrate 14 protrudes further to the right than the first substrate 10, and the protruding portion 40 is configured so as not to overlap the first substrate 10 but to overlap the first moistureproof film 26, in the substrate thickness direction. Further, the electrophoresis device 1 according to this embodiment is provided with a plurality of second electrodes 16. These second electrodes 16 are arranged in matrix, to function as pixel electrodes.

Here, as a flexible substrate which constitutes the second substrate 14, resin materials having excellent properties, such as light weight, flexibility, elasticity, etc. can be used. The resin used for this sealing material can be either a thermoplastic resin or a thermosetting resin, examples of which include polyolefins such as polyethylene, polypropylene, ethylene-propylene copolymers, and ethylene-vinyl acetate copolymers (EVA), cyclic polyolefins, denatured polyolefins, polyvinyl chloride, polyvinylidene chloride, polystyrene, polyamide, polyimide, polyamide-imide, polycarbonate, poly(4-methylpentene-1), ionomers, acrylic resins, polymethyl methacrylate, acrylic-styrene copolymers (AS resins), butadiene styrene copolymers, polyol copolymers (EVOH), polyesters such as polyethylene terephthalate (PET), polybutylene terephthalate (PBT), polycyclohexane terephthalate (PCT), polyether, polyether ketone (PEK), polyether ether ketone (PEEK), polyether imide, polyacetal (POM), polyphenylene oxide, denatured polyphenylene oxide, polyallylate, aromatic polyester (liquid crystal polymers), polytetrafluoroethylene, polyvinylidene fluoride, and other fluororesins, various thermoplastic elastomers such as those based on styrene, polyolefins, polyvinyl chloride, polyurethane, fluororubbers, chlorinated polyethylene, or the like, epoxy resin, phenol resin, urea resin, melamine resin, unsaturated polyester, silicone resin, and polyurethane, as well as copolymers, blends, polymer alloys, and so forth having some of the above as their main components. These can be used singly or in combinations of two or more types (such as a laminate of two or more layers). The thickness of the flexible substrate (i.e. first substrate) is about 1 to 500 μm, and more preferably about 25 to 200 μm from the viewpoint of mechanical strength and flexibility.

The wiring pattern 22 is electrically connected to the second electrode 16 via a connector (via) 24 passing through the second substrate 14, and is provided on the other surface of the second substrate 14 so as to extend to the abovementioned protruding portion 40 of the second substrate 14. The wiring pattern 22 is obtained by patterning a conductive film, such as aluminum, into a predetermined shape. Further, the connector 24 is obtained by burying conductors, such as aluminum, in a through hole provided in the second substrate 14.

In addition, although illustration is omitted, a thin film semiconductor circuitry layer may be provided on the one surface and/or on the other surface of the second substrate 14. Here, the thin film semiconductor circuitry layer includes, for example, a plurality of wiring groups which are arranged in a row direction and in a column direction, respectively, a pixel electrode group, a pixel driving circuit, connecting terminals, and row and column decoders that select driving pixels, etc.

The electrophoretic layer S8 is formed such that it is interposed between the first electrode 12 and the second electrode 16. The electrophoretic layer 18 includes a large number of microcapsules fixed with a binder. An electrophoretic dispersion medium and electrophoretic particles are contained in the microcapsules. The electrophoretic particles have a property of moving in the electrophoretic dispersion medium according to an applied voltage, and one or more types (one or more colors of) of the electrophoretic particles are used. The thickness of the electrophoretic layer 18 is, for example, about 50 µm to 75 µm. The electrophoretic layer 18 can be formed by mixing the above-mentioned microcapsules along with a desired dielectric constant moderator in a binder, and coating the resulting resin composition (emulsion or organic solvent solution) on a base material by using known coating methods, such as a method using a roll coater, a method using a roll laminator, a screen printing method, and a spray method.

As the electrophoretic dispersion medium, a single one of or a mixture of the following materials to which a surfactant and so on is added may be used: water; alcohol solvents such as methanol, ethanol, isopropanol, butanol, octanol and methyl cellosolve; esters such as ethyl acetate and butyl acetate; ketones such as acetone, methyl ethyl ketone and methyl isobutyl ketone; aliphatic hydrocarbons such as pentane, hexane and octane; alicyclic hydrocarbons such as cyclohexane and methylcyclohexane; aromatic hydrocarbons such as benzene, toluene, xylene, hexylbenzene; halogenated hydrocarbons such as methylene chloride, chloroform, carbon tetrachloride and 1,2-dichloreethane; carboxylates; and other various oils.

The electrophoretic particles, as mentioned above, are particles (polymers or colloids) having the property of moving toward a desired electrode based on electrophoresis due to a potential difference in the electrophoretic dispersion medium. As the electrophoretic particles, for example, one of or two or more of the following types of pigments may be used: black pigments such as aniline black and carbon black; white pigments such as titanium dioxide, zinc oxide and antimony trioxide; azo based pigments such as monoazo, dis-azo, and polyazo; yellow pigments such as isoindolenone, chrome yellow, yellow iron oxide, cadmium yellow, titanium yellow, and antimony; red pigments such as quinacrilidone red and chrome vermillion; anthraquinone-based dyes such as phthalocyanine blue and indanthrene blue; blue pigments such as prussian blue and ultramarine blue, cobalt blue, etc.; and green pigments such as phthalocyanine green. Moreover, if necessary, the following agents can be added to these pigments: a charge-controlling agent made of particles of an electrolyte, surfactant, metal soap, resin, rubber, oil, varnish, compound or the like; a dispersing agent such as a titanium coupling agent; a lubricating agent; a stabilizing agent; and so forth.

As the materials constituting the microcapsules, materials having flexibility, such as Arabic-gum/gelatin based compounds and urethane-based compounds are preferably used. The microcapsules can be formed using known microencapsulation techniques, such as an interfacial polymerization method, an insolubilization reaction method, a phase separation method or an interfacial sedimentation method. Further, microcapsules whose size is substantially uniform are preferable since they allow an excellent display function to be exhibited. Microcapsules whose sizes are substantially uniform can be obtained by using, for example, filtration or specific gravity difference classification. The size of the microcapsules is generally about 30 to 60 µm.

The binder is not particularly limited so long as it has a good affinity to the microcapsules, an excellent adhesiveness to the electrodes, and insulation property. As the binder, binders illustrated below can be used like the above-mentioned insulating synthetic resin base material. For example, any of the following materials can be used: thermoplastic resins such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, and cellulose resin; polymers such as polyamide resin, polyacetal, polycarbonate, polyethylene terephthalate, polybutylene terephthalate, polyphenylene oxide, polysulfone, polyamide imide, polyaminobismaleimide, polyethersulfone, polyphenylene sulfone, polyarylate, grafted polyphenylene ether, polyetheretherketone, and polyetherimide; and fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, and fluororubber; silicon resins such as silicone resins and silicone rubber. As other binder materials, a methacrylic-acid-styrene copolymer, polybutylene, a methacrylic-acid methyl butadiene styrene copolymer, etc. can be used. Further, as for the binder material, it is preferable to make the dielectric constant of an electrophoretic display liquid approximately equal to the dielectric constant of the dispersing agent, as disclosed in, for example, JP-A-10-149118.

A connection electrode 20 is formed in a peripheral portion (periphery of a display region) of the second substrate 14 to electrically connect the first electrode 12 of the first substrate 10 to a wiring pattern (not shown) on the one surface of the second substrate 14.

Figure 2:
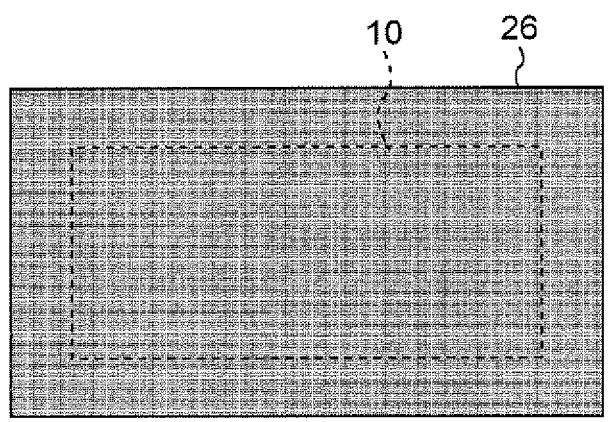
FIG. 2 is a view for explaining the shape of each of a first substrate and a first moistureproof film.

The first moistureproof film 26 is bonded to the other surface of the first substrate 10 to seal and protect the electrophoretic layer 18. This first moistureproof film 26 is formed by using a material having translucency, such as a polyethylene terephthalate (PET) film. Hereinafter, the shape of the first moistureproof film 26 will be described with reference to FIG. 2. FIG. 2 is a view for explaining the shape of each of the first substrate 10 and the first moistureproof film 26, which shows a schematic plan view of a bonding material between the first substrate 10 and the first moistureproof film 26 when viewed from the first moistureproof film 26. As shown in FIG. 2, the first moistureproof film 26 (represented by a pear skin texture in the figure) has, in addition to a portion contacting the other surface of the first substrate 10, a frame-like surplus portion disposed at the periphery of the portion. This surplus portion is used for forming a space in which sealant (sealing resin) 30 is provided, as will be described below.

Figure 3A:
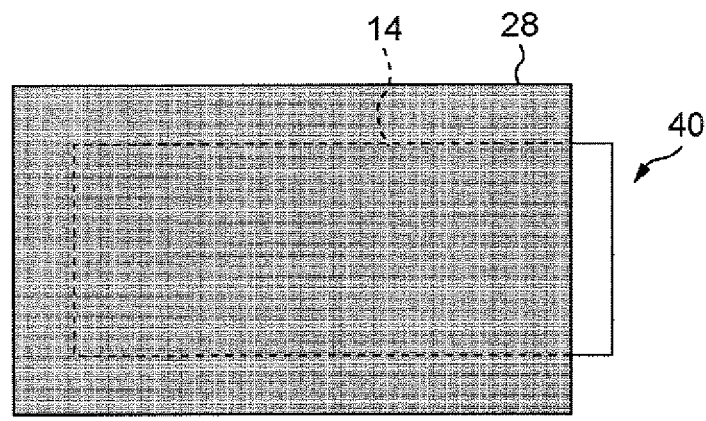
FIGS. 3A and 3B are views for explaining the shape of each of a second substrate and a second moistureproof film.
Figure 3B:
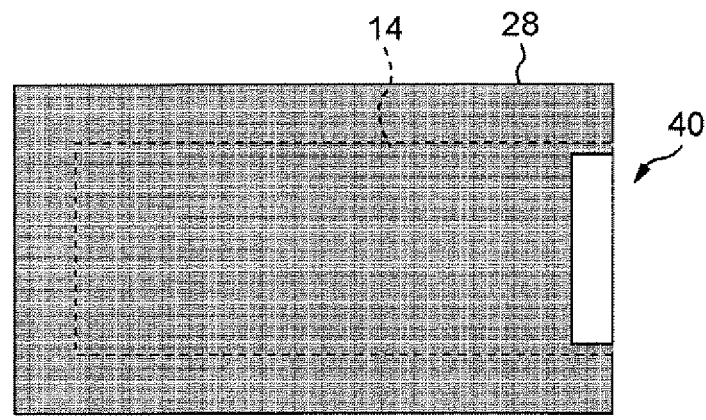

The second moistureproof film 28 is bonded to the other surface of the second substrate 14 to seal and protect the electrophoretic layer 18. This second moistureproof film 28 is formed by using a material having translucency, such as a polyethylene terephthalate (PET) film. Hereinafter, the shape of the second moistureproof film 28 will be described with reference to FIG. 3. FIG. 3 is a view for explaining the shape of each of the second substrate 14 and the second moistureproof film 28, which shows a schematic plan view of a bonding material between the second substrate 14 and the second moistureproof film 28 when viewed from the second moistureproof film 28. As shown in FIG. 3, the first moistureproof film 28 (represented by a pear skin texture in the figure) has, in addition to a portion contacting the other surface of the first substrate 14, a frame-like surplus portion disposed at the periphery of the portion. This surplus portion is used for forming a space in which sealant (sealing resin) 30 is provided, as will be described below. Further, as shown in FIG. 3A, the second moistureproof film 28 is disposed so as to expose at least a portion of the protruding portion 40 (or the entire protruding portion) of the second substrate 14. In addition, as shown in FIG. 3B, the protruding portion 40 of the second substrate 14 may be exposed by providing a cutout portion in one end (right end in the illustrated example) of the second moistureproof film 28.

Sealant (first sealant) 30 is provided between the first moistureproof film 26 and the protruding portion 40 of the second substrate 14 and between the surplus portion of the first moistureproof film 26 and the surplus portion of the second moistureproof film 28. As the sealant 30, epoxy resin, silicon resin, acrylic resin, etc. can be used appropriately. Moreover, sealant in which inorganic particulates, such as silica and alumina, are dispersed in the resins, can also be used appropriately. These resins may be any of photocurable resins, thermosetting resins, and two-liquid mixed curable resins, and are preferably resins having low viscosity to such a degree that they do not contain bubbles at the time of filling and having high viscosity (specifically, about 0.1 to 10 cP) to such a degree that they do not flow out. As the filling method, for example, a method in which sealant is filled between the first moistureproof film 26 and the second substrate 14 or between the first moistureproof film 26 and the second moistureproof film 28 while an appropriate amount of sealant is discharged by a microdispenser can be adopted. In order to avoid mixing of bubbles as much as possible, it is also preferable to perform the operation of filling sealant in a vacuum state (low-pressure state).

The electrophoresis device 1 according to this embodiment has the configuration as described above, and as shown in the figure, establishes an electrical connection between the wiring pattern 22 and the external device 50 in a place where the protruding portion 40 of the second substrate 14 is exposed. Here, the external device 50 is, for example, a flexible printed circuit (FPC) substrate. The connection between the wiring pattern 22 and the external device 50 is performed, for example, by pasting both of them together using an anisotropic conductive film (not shown).

Figure 4:
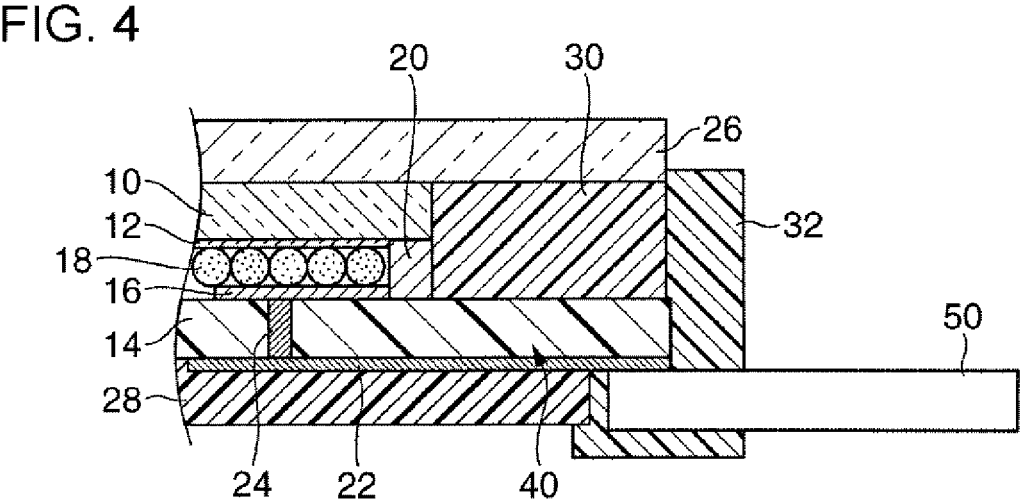
FIG. 4 is a sectional view showing the structure of an electrophoresis device according to a second embodiment.

FIG. 4 is a sectional view showing the structure of an electrophoresis device according to a second embodiment. An electrophoresis display device 1a shown in FIG. 4 has almost the same configuration as the electrophoresis device 1 according to the above-described first embodiment, and is different from the electrophoresis device in that sealant (second sealant) 32 is further added. In addition, the components common to both of them are denoted by the same reference numerals, and detailed description thereof is omitted. As shown in FIG. 4, the sealant 32 is provided so as to cover at least a place where the wiring pattern 22 and the external device 50 are connected together, and the vicinity thereof, and an end face of the protruding portion 40 of the second substrate 14. The sealant 32 in the illustrated example is provided so as to further cover an end face of the sealant 30 and an end face of the first moistureproof film 26. As the sealant 32, similar to the above-mentioned sealant 30, epoxy resin, silicon resin, acrylic resin, etc. can be used appropriately.

Figure 5:
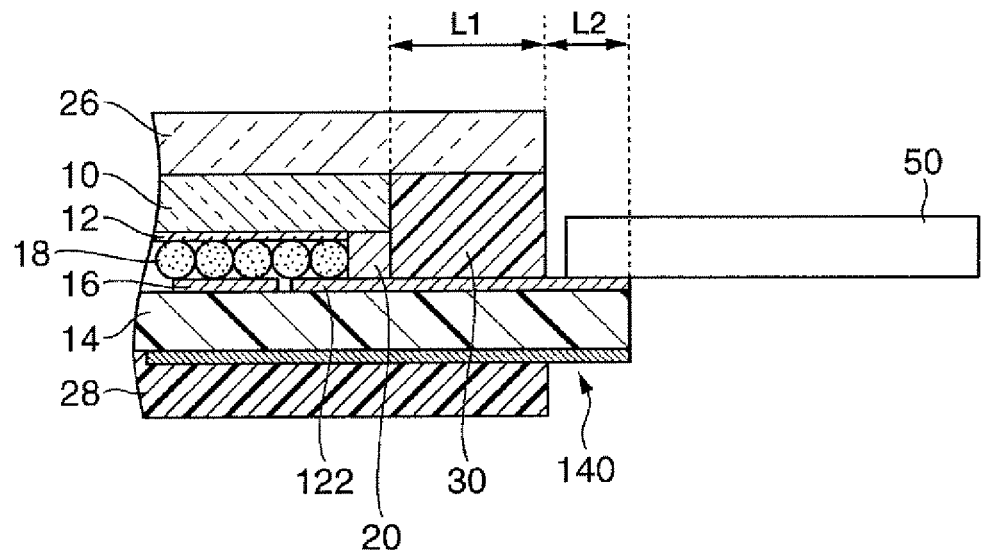
FIG. 5 is a sectional view showing the structure of an electrophoresis device according to a comparative example.

FIG. 5 is a sectional view showing the structure of an electrophoresis device according to a comparative example. The electrophoresis display device according to the comparative example shown in FIG. 5 has a structure in which the second substrate 14 protrudes further to the outside than the sealant 30 in a peripheral end face, and a wiring pattern 122 provided on the one surface of the second substrate 14 is exposed to the outside. In the rest of the structure, the electrophoresis display device is almost the same as the electrophoresis device according to the above-described first or second embodiment. In the electrophoresis device according to the comparative example, the width of a frame portion is at least a total width (L1+L2) of a width L1 of the sealant 30 required for moisture-proofing and a width L2 required for establishing an electrical connection with the external device 50. On the other hand, in the electrophoresis device according to the first or second embodiment, since the width of the sealant 30 required for moisture proofing and the width for electrical connection with the external device 50 overlap each other as can be seen from FIG. 1 or 4, it is possible to make the frame portion small accordingly, thereby acquiring a narrow frame portion. From another viewpoint, when the width of the frame portion of the electrophoresis device according to the comparative example is intended to be approximately equal to that of this embodiment, as shown in FIG. 5, it is necessary to make the width L1 of the sealant 30 small, which will deteriorate moisture resistance accordingly. That is, if an allowed frame width in the electrophoresis device according to this embodiment is considered constant, it can be ensured that the width L1 of the sealant 30 is greater than that in the electrophoresis device according to the comparative example, and moisture resistance can be improved.

Hereinafter, other embodiments of the electrophoresis device to which the invention is applied will be described further.

Figure 6:
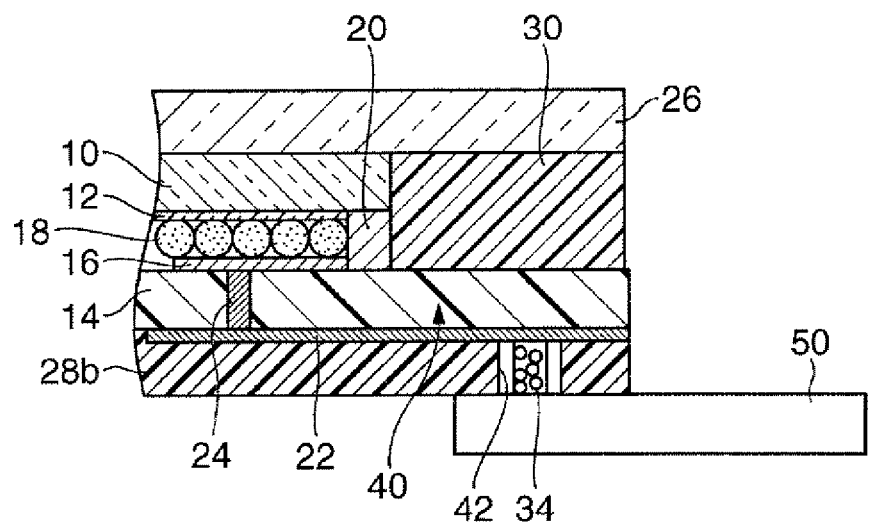
FIG. 6 is a sectional view showing the structure of an electrophoresis device according to a third embodiment.

FIG. 6 is a sectional view showing the structure of an electrophoretic apparatus of a third embodiment. An electrophoresis display device 1b shown in FIG. 3 has almost the same configuration as the electrophoresis device 1 according to the above-described first embodiment, and is somewhat different from the electrophoresis device in terms of the connecting structure of the wiring pattern 22 and the external device 50. In addition, the components common to both the devices are denoted by the same reference numerals, and detailed description thereof is omitted. In an electrophoresis device 1b shown in FIG. 6, a second moistureproof film 28b is provided so as to cover almost the other surface of the second substrate 14, and has a cutout portion 42 inside an end thereof in a portion contacting the protruding portion 40. This cutout portion 42 is formed by hollowing out a portion of the second moistureproof film 28b in the shape of a window, and functions to expose a portion of the wiring pattern 22. And the external device 50 is electrically connected to the wiring pattern 22 via a conductive connector 34 disposed inside this cutout portion 42. Here, as the conductive connector 34, for example, an anisotropic conductive film is used. The same effects as the electrophoresis device 1 according to the above described first embodiment can also be obtained by the electrophoresis device 1b of such an aspect.

Figure 7:
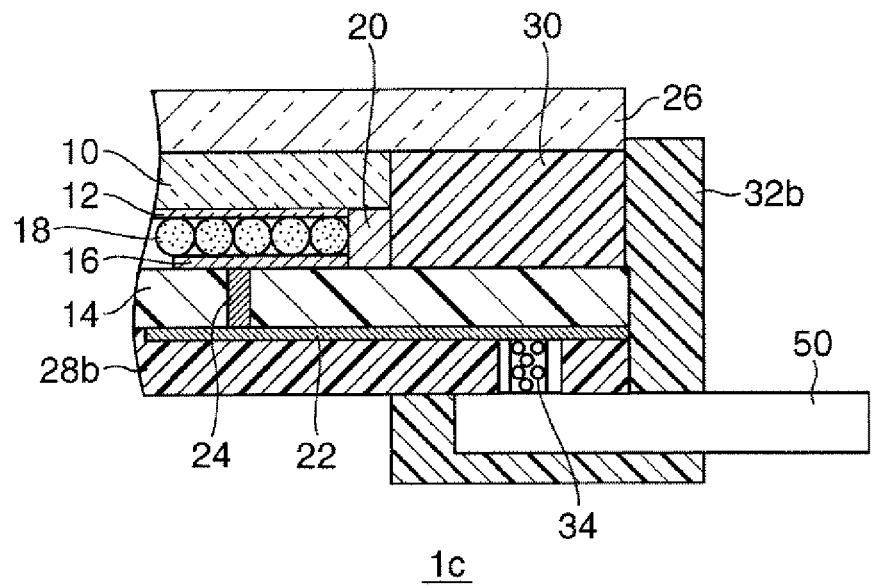
FIG. 7 is a sectional view showing the structure of an electrophoresis device according to a fourth embodiment.

FIG. 7 is a sectional view showing the structure of an electrophoresis device according to a fourth embodiment. An electrophoresis display device 1c shown in FIG. 7 has almost the same configuration as the electrophoresis device 1 according to the above-described third embodiment, and is different from the electrophoresis device in that sealant (second sealant) 32b is further added. In addition, the components common to both the devices are denoted by the same reference numerals, and detailed description thereof is omitted. As shown in FIG. 7, the sealant 32b is provided so as to cover at least a place where the wiring pattern 22 and the external device 50 are connected together, and the vicinity thereof, and an end face of the protruding portion 40 of the second substrate 14. The sealant 32 in the illustrated example is provided so as to further cover an end face of the sealant 30 and an end face of the first moistureproof film 26. As the sealant 32, similar to the above-mentioned sealant 30, epoxy resin, silicon resin, acrylic resin, etc. can be used appropriately. The same effects as the electrophoresis device 1a of the above-described second embodiment can also be obtained by the electrophoresis device 1c of such an aspect.

Figure 8:
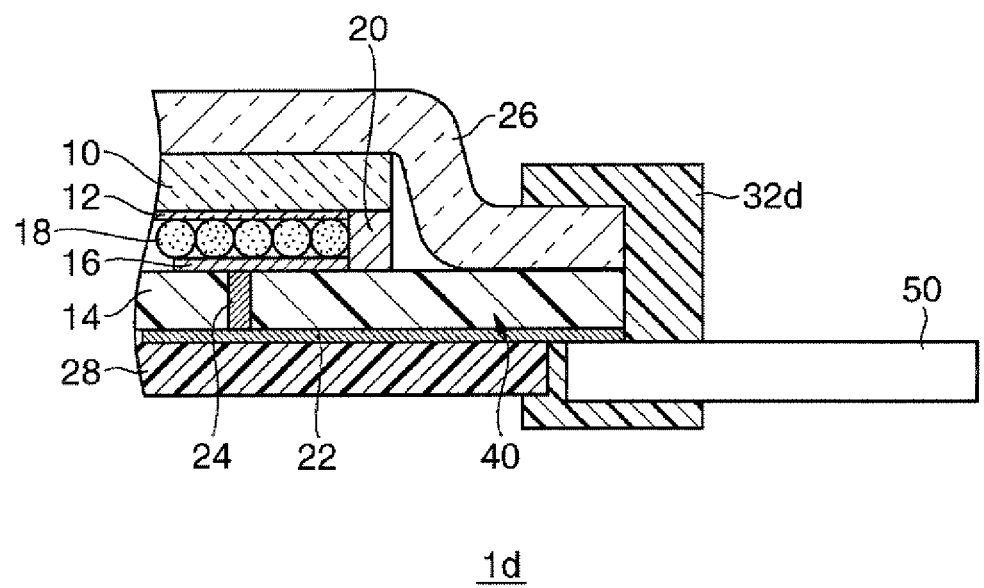
FIG. 8 is a sectional view showing the structure of an electrophoresis device according to a fifth embodiment.

FIG. 8 is a sectional view showing the structure of an electrophoresis device according to a fifth embodiment. An electrophoresis display devices 1d shown in FIG. 8 have the same configuration as the electrophoresis device 1 according to the above-described first embodiment, and is different from the electrophoresis device I according to the above-described first embodiment in that the sealant 30 is omitted, and the first moistureproof film 26 is directly bonded to the second substrate 14 or the second moistureproof film 28. In addition, the components common to both the devices are denoted by the same reference numerals, and detailed description thereof is omitted. More specifically, as shown in FIG. 8, the surplus portion (refer to FIG. 2) of the first moistureproof film 26 is directly bonded to the protruding portion 40 of the second substrate 14. Similarly, the surplus portion (refer to FIG. 2) of the first moistureproof film 26 is directly bonded to the surplus portion (refer to FIG. 3) of the second substrate. For example, an epoxy resin adhesive is used for bonding. Further, as shown in FIG. 8, sealant 32d is provided so as to cover at least a place where the wiring pattern 22 and the external device 50 are connected together, and the vicinity thereof, and an end face of the protruding portion 40 of the second substrate 14. The sealant 32d in the illustrated example is provided so as to further cover end faces of the first moistureproof film 26 and the second moistureproof film. As the sealant 32d, similar to the above-mentioned sealant 30, epoxy resin, silicon resin, acrylic resin, etc. can be used appropriately. Also by the electrophoresis device id of such an aspect, the same effects as the electrophoresis device 1 according to the above-described first embodiment can be obtained. That is, since the width of sealing between the first moistureproof film 26 and the second moistureproof film 28 required for moisture-proofing and the width for electrical connection with the external device 50 overlap each other, it is possible to make the frame portion small accordingly, acquiring a narrow frame portion.

Next, concrete examples of electronic apparatuses including the electrophoresis device relating to each of the above-described embodiments will be described.

Figure 9A:
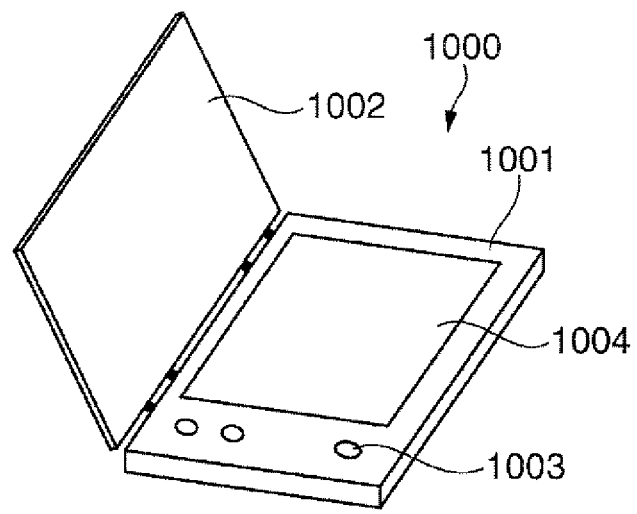
FIGS. 9A to 9C are perspective views for explaining concrete examples of electronic apparatuses to which the electrophoresis device is applied.
Figure 9B:
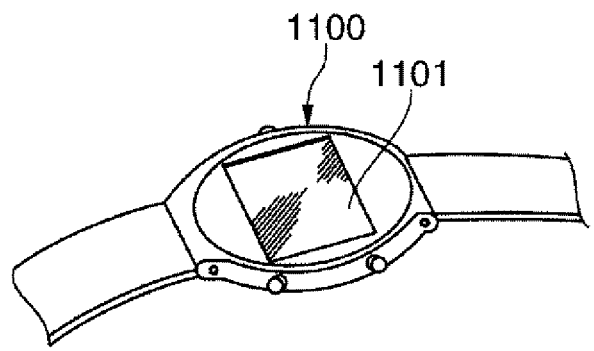
Figure 9C:
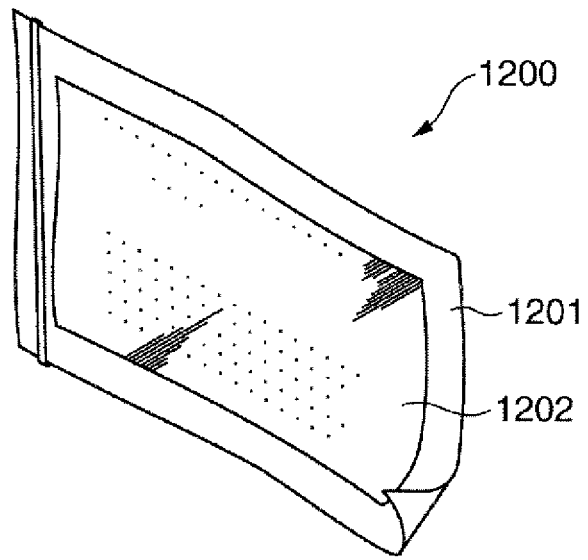

FIG. 9 is a perspective view illustrating concrete examples of electronic apparatuses to which the electrophoresis device is applied. FIG. 9A is a perspective view showing an electronic book that is an example of an electronic apparatus. This electronic book 1000 includes a book-shaped frame 1001, an (openable and closable) cover 1002 rotatably provided with respect to the frame 1001, an operation unit 1003, and a display unit 1004 constituted of the electrophoresis device related to this embodiment. FIG. 9B is a perspective view showing a wrist watch that is an example of an electronic apparatus. This wrist watch 1100 includes a display unit 1101 constituted of the electrophoresis device related to this embodiment. FIG. 9 is a perspective view showing an electronic paper that is an example of an electronic apparatus. This electronic paper 1200 includes a main body 1201 constituted of rewritable sheet having the same texture and flexibility as paper, and a display unit 1202 constituted of the electrophoresis device related to this embodiment. In addition, the electronic apparatuses to which the electrophoresis device can be applied are not limited thereto, but widely include apparatuses utilizing changes in a visual tone accompanying migration of charged particles. For example, the electronic apparatuses also include things belonging to real estate, such as wall surfaces to which an electrophoretic film is pasted, and things belonging to movable bodies, such vehicles, flying bodies, and vessels, in addition to the apparatuses as described above.

In addition, it should be understood that the invention is not limited to the contents of the above-described embodiments, but various modifications may be made thereto within the scope of the subject matter of the invention. For example, although an electrophoretic layer of a type which uses microcapsules as a concrete example of the electrophoretic layer has been described in the above-described embodiments, it is also possible to use electrophoretic layers of other types, such as an electrophoretic layer of a type that an electrophoretic dispersion liquid is enclosed in each of a plurality of cells (small space) formed by using partition walls.

The entire disclosure of Japanese Patent Application No. 2005-239791, filed Aug. 22, 2005 is expressly incorporated by reference herein.

What is claimed is:

1. An electrophoresis device comprising:
    a translucent first substrate having a first electrode below one surface thereof;
    a second substrate having a second electrode above one surface thereof, and disposed to face the first substrate such that a protruding portion is present at one side of the second substrate, wherein in a plan view, the protruding portion does not overlap the first substrate, the protruding portion including a first part;
    a wiring pattern electrically connected to the second electrode via a first contact hole of the second substrate, and provided below the other surface of the second substrate such that the wiring pattern extends along the protruding portion of the second substrate, a second part of the wiring pattern overlapping the first part in the plan view;
    an electrophoretic layer interposed between the first electrode and the second electrode;
    a translucent first moistureproof film having a first portion contacting the other surface of the first substrate and a first surplus portion disposed around the first portion;
    a second moistureproof film having a second portion contacting the other surface of the second substrate and a second surplus portion disposed around the second portion, the second moistureproof film not overlapping the first part and the second part in the plan view;
    an external device provided above a first surface of the second moistureproof film, the first surface of the second moistureproof film being opposite to the second substrate, and a flexible wiring substrate of the external device being electrically connected to the second part; and
    a sealant provided between the first surplus portion and the second surplus portion, the sealant overlapping the second part in the plan view.

2. The electrophoresis device according to claim 1, wherein in the plan view, the sealant covers the protruding portion of the second substrate.

3. The electrophoresis device according to claim 2, further comprising a second sealant provided to cover at least a place where the wiring pattern and the external device are connected together, and the vicinity thereof, and an end face of the protruding portion of the second substrate.

4. The electrophoresis device according to claim 1,
    wherein the first surplus portion of the first moistureproof film, the second surplus portion of the second moistureproof film, and the protruding portion of the second substrate are bonded together.

5. The electrophoresis device according to claim 4, further comprising a second sealant provided to cover at least a place where the wiring pattern and the external device are connected together, and the vicinity thereof, and an end face of the protruding portion of the second substrate.

6. An electronic apparatus comprising the electrophoresis device according to claim 1.

7. The electrophoresis device according to claim 1, wherein the external device is electrically connected to the wiring pattern via a conductive connector inside a second contact hole formed in the second moistureproof film.

8. An electrophoresis device comprising:
- a first moistureproof film;
- a second moistureproof film;
- an electrophoretic layer disposed between the first moistureproof film and the second moistureproof film;
- a first substrate disposed between the first moistureproof film and the electrophoretic layer;
- a first electrode disposed between the first substrate and the electrophoretic layer;
- a second substrate disposed between the electrophoretic layer and the second moistureproof film;
- a second electrode disposed between the electrophoretic layer and the second substrate;
- a wiring pattern disposed between the second substrate and the second moistureproof film;
- a via electrically connecting the second electrode to the wiring pattern;
- an external device, wherein the second moistureproof film is disposed between the wiring pattern and the external device;
- a conductive connector electrically connecting the wiring pattern and the external device through a cutout portion of the second moistureproof film,
- wherein the second substrate includes a first portion and a protruding portion, and, in a plan view, the protruding portion does not overlap the first substrate; and
- a sealant disposed between the first moistureproof film and the protruding portion of the second substrate,
- wherein the wiring pattern extends along the protruding portion of the second substrate,
- wherein, in the plan view, the external device does not overlap the first substrate, the first electrode, the electrophoretic layer, or the second electrode, and
- wherein, in the plan view, a first part of the second substrate is coextensive with the cutout portion, a second part of the wiring pattern is coextensive with the cutout portion, and the sealant overlaps the first part and the second part.

\* \* \* \* \*